UNITED STATES PATENT OFFICE.

KOKICHI MIKIMOTO, OF TOKYO, JAPAN.

PROCESS OF TREATING OYSTERS AND OTHER MOLLUSKS.

988,889. Specification of Letters Patent. Patented Apr. 4, 1911.

No Drawing. Application filed July 8, 1910. Serial No. 571,043.

*To all whom it may concern:*

Be it known that I, KOKICHI MIKIMOTO, a subject of the Emperor of Japan, residing at No. 3 Shichome, Ginza, Tokyo, Empire of Japan, have invented certain new and useful Improvements in Processes of Treating Oysters and other Mollusks, of which the following is a specification.

The present invention relates to a novel process for the deposition of mother-of-pearls, and has reference more particularly to a method of injecting a liquid or liquefied substance by means of a fine needle syringe into the mantle of the pearl-oyster or similar species of oysters. The liquid substance so injected acts as an artificial stimulus for the deposition of mother-of-pearl, nacreous secretion being formed around the said stimulus by the oyster or other bivalve until the liquid stimulus is completely encysted or encapsulated in concentric layers, whereby beautiful pearls may be produced.

The object of the present invention is to obtain perfectly round pearls in a comparatively simple and easy manner.

A further object of the invention is to effect the process in such a manner that the artificial stimulus may be maintained firmly in its desired position from the time that it is injected into the mantle of the oyster or other mollusk.

In the ordinary method, the liability of the stimulus to move away from the position where it was first introduced has been a great drawback; frequently the stimulus is expelled from the shells. These drawbacks are wholly obviated by the present invention, whereby the liquid stimulus is injected by means of a fine needle syringe. Furthermore the present process has the advantage that the trouble incident to the manufacture of a special nucleus or stimulus for the purpose of depositing mother-of-pearls, is avoided.

My improved process is effected in the following manner:—When the young oysters are old enough to be operated upon, they are taken out from the beds. A liquid or liquefied substance which will not be injurious to the development and growth of the oysters, which substance is preferably mercury, is then injected into the mantle of the oysters at the desired point by means of a fine needle syringe, a suitable quantity of such liquid, as mercury, being injected into each oyster. The oysters thus operated upon are then replanted into the beds, where they remain for a certain number of years. In the meantime, as the oysters cannot expel the liquid which has been introduced as before described, they encyst or encapsulate the substance by secreting nacreous matter around it, with the final result that mother-of-pearls is produced.

Although the substance used for injection consists preferably of mercury, I do not limit myself however to such material, as other suitable substances may be used.

I claim:

1. The process of treating oysters and other mollusks, which consists in injecting mercury into the mantle of the oyster, the mercury becoming encysted during the growth of the oyster or other mollusk in a secretion of nacreous matter formed around it, with the eventual formation of mother-of-pearls.

2. The process of treating oysters and other mollusks, which consists in injecting mercury into the mantle of the oyster by means of a fine needle syringe, the said mercury serving as a stimulus for the formation of a nacreous secretion around it, with the eventual formation of mother-of-pearls.

Signed at Yokohama, this fourteenth day of June, 1910.

KOKICHI MIKIMOTO.

Witnesses:
HAMTADA YORUMURA,
GENJI KURIBARA.